US008505933B2

(12) United States Patent
Bernard et al.

(10) Patent No.: US 8,505,933 B2
(45) Date of Patent: Aug. 13, 2013

(54) ROLL CONTAINER WITH INSERT BASES

(75) Inventors: Oliver Bernard, Blaibach (DE); Christian Kolnhofer, Traitsching (DE)

(73) Assignee: Gebhardt Transport- und Lagersysteme GmbH, Cham (DE)

( * ) Notice: Subject to any disclaimer, the term of this patent is extended or adjusted under 35 U.S.C. 154(b) by 188 days.

(21) Appl. No.: 12/955,655

(22) Filed: Nov. 29, 2010

(65) Prior Publication Data

US 2011/0127735 A1 Jun. 2, 2011

(30) Foreign Application Priority Data

Nov. 30, 2009 (DE) .......................... 10 2009 056 363
Nov. 30, 2009 (DE) ...................... 20 2009 016 204 U

(51) Int. Cl.
*B62B 3/16* (2006.01)
(52) U.S. Cl.
USPC ................................. 280/33.998; 280/33.995
(58) Field of Classification Search
USPC ............. 280/33.998, 33.991, 33.995, 33.997, 280/79.11, 79.3, 47.34, 47.35; 211/126.1, 211/126.2, 126.15, 186, 87, 188, 194, 153, 211/207; 108/91, 102, 137, 143
See application file for complete search history.

(56) References Cited

U.S. PATENT DOCUMENTS

| | | | | |
|---|---|---|---|---|
| 1,691,621 | A | * | 11/1928 | Young .......................... 280/79.3 |
| 2,478,458 | A | * | 8/1949 | Carter et al. ................ 211/71.01 |
| 2,845,780 | A | * | 8/1958 | Conklin et al. ................. 62/291 |
| 2,928,681 | A | * | 3/1960 | Wilson ..................... 280/33.997 |

(Continued)

FOREIGN PATENT DOCUMENTS

| | | |
|---|---|---|
| EP | 0 309 058 B1 | 6/1993 |
| EP | 1 777 137 A1 | 4/2007 |
| NL | 8501404 A | 12/1986 |

OTHER PUBLICATIONS

Partial European Search Report for EP 10 40 1204 dated Jul. 17, 2012 (3 pages).

(Continued)

*Primary Examiner* — Katy M Ebner
*Assistant Examiner* — Brodie Follman
(74) *Attorney, Agent, or Firm* — The Culbertson Group, P.C.

(57) ABSTRACT

A roll container has a preferably rectangular base with transport rollers mounted on an underside of the base and two opposing side walls are arranged on an upper side of the base. Each of the opposing side walls has a vertical front end strut and a vertical rear end strut, which are connected by means of several horizontally running support struts, with the interior side of each of the vertical front struts lying in a respective vertical reference plane (E-E). The rear end struts may be offset sufficiently inward relative to the respective reference plane (E-E) that another roll container of the same type may be inserted from the front between the side walls of the roll container. The horizontal support struts are arranged and constructed in such a manner that, apart from a front connecting section to the front end strut and a rear connecting section to the rear end strut, they lie in between the two reference planes (E-E), and, in stackable embodiments, in the intermediate space delimited by the respective reference plane (E-E) and an inner limiting plane that is defined by the exterior sides of the rear end struts and runs parallel to the respective reference plane (E-E). Each two associated support struts of the two side walls are used as support means and guide means for a respective insert base that can be inserted between the side walls.

15 Claims, 7 Drawing Sheets

(56) References Cited

U.S. PATENT DOCUMENTS

| | | | |
|---|---|---|---|
| 3,007,708 A * | 11/1961 | Ochs | 280/33.998 |
| 3,199,683 A * | 8/1965 | Graswich | 211/41.1 |
| 3,523,694 A * | 8/1970 | Oliver | 280/33.998 |
| 3,628,805 A * | 12/1971 | Archer | 280/33.998 |
| 3,689,098 A * | 9/1972 | Rubin | 280/33.998 |
| 3,698,733 A * | 10/1972 | Isaacs | 280/33.998 |
| RE27,683 E * | 6/1973 | Rubin | 280/33.998 |
| 3,861,702 A * | 1/1975 | Wilson | 280/33.996 |
| 3,861,768 A * | 1/1975 | Wilson | 312/249.8 |
| 3,887,207 A * | 6/1975 | Gotsch, Jr. | 280/33.998 |
| 3,902,603 A * | 9/1975 | Wilson | 211/133.1 |
| 3,953,044 A * | 4/1976 | Wilson | 280/33.996 |
| 3,981,510 A * | 9/1976 | Gustafsson | 280/33.996 |
| 4,004,819 A * | 1/1977 | Brongo | 280/79.3 |
| 4,065,141 A * | 12/1977 | Wilson | 280/33.996 |
| 4,209,183 A * | 6/1980 | Jones et al. | 280/79.3 |
| 4,588,096 A | 5/1986 | Story et al. | |
| 5,125,520 A * | 6/1992 | Kawasaki | 211/133.1 |
| 5,718,441 A * | 2/1998 | Kern et al. | 280/79.3 |
| 5,785,189 A * | 7/1998 | Gollob et al. | 211/187 |
| 5,957,309 A * | 9/1999 | Hall | 211/126.2 |
| 6,135,299 A * | 10/2000 | Burgess | 211/194 |
| 6,173,847 B1 * | 1/2001 | Zellner et al. | 211/186 |
| 6,203,035 B1 * | 3/2001 | Ondrasik | 280/79.3 |
| 6,402,167 B1 * | 6/2002 | Calleja | 280/79.3 |
| 6,419,098 B1 * | 7/2002 | Hall | 211/133.1 |
| 6,511,082 B2 * | 1/2003 | Shirai | 280/79.11 |
| 6,974,042 B2 * | 12/2005 | Hall | 211/133.1 |
| 7,419,063 B1 * | 9/2008 | Hall | 211/133.1 |
| 7,533,948 B2 * | 5/2009 | Smith et al. | 312/408 |
| 2002/0130098 A1 | 9/2002 | Simard | |
| 2003/0196975 A1 * | 10/2003 | Murray et al. | 211/126.2 |
| 2004/0007550 A1 * | 1/2004 | Leeman et al. | 211/189 |
| 2009/0020449 A1 * | 1/2009 | Artinger | 206/518 |

OTHER PUBLICATIONS

Russian PTO, Office Action issued Jan. 15, 2013 in corresponding Russian application No. 2010148668 (6 pages).

* cited by examiner

ROLL CONTAINER WITH INSERT BASES

TECHNICAL FIELD OF THE INVENTION

The invention relates to a roll container particularly for transporting food, cosmetics or basic commodities in large packages. The invention further relates to an insert base for such a container.

BACKGROUND OF THE INVENTION

So-called roll containers are mainly used by retail chain stores for transporting food, cosmetics and basic commodities. A distinction is made between so-called non-nestable roll containers, i.e., roll containers that cannot be inserted one into another, and stackable roll containers. Non-nestable roll containers require considerable warehouse costs and are impractical to use. The dismantling effort (e.g., for return transport) is also considerable, and the damage rate for wheels and frames is significant, especially for containers transported upside-down.

Known nestable roll containers have a specially constructed base frame, in a trapezoidal shape of the bottom construction, or the shape of a "Z" or "V," with these known designs enabling straight-line or lateral nesting.

Most known designs of nestable roll containers are relatively heavy-weight constructions, which emit considerable noise when rolling and are therefore suited only to a limited extent to modern conveyor technology.

EP 1777137 A1 describes a roll container that is constructed to be nestable with containers of the same type, which therefore can be inserted one into another. For this purpose, two struts arranged pivotably and bearing rollers are provided that can be pivoted relative to one another by an amount such that additional identically constructed containers can be inserted into the space resulting between the struts. The roll containers can be arranged in a space-saving manner in this way. The pivotable arrangement of the struts, however, implies a corresponding construction effort. Moreover, it causes a lack of stability, which is necessary for rough operation in a warehouse since damage to or defects of containers often occur.

To eliminate this disadvantage of the above-mentioned prior art, a stackable roll container is known from DE 10 2007 033 147 B4 in which the side walls of the roll container are designed in a special way to allow stackability without using articulated connections. For this purpose, the rear end strut of each of the opposing side walls is pulled, from a reference plane in which the front end strut is located, sufficiently far inward that the container can be inserted between the front struts of another container. The front end struts must of course have a clear distance between them that is not only larger than the distance between the rear end struts (measured in the width direction of the container), but is also greater than the width of the base. This container can also have a grid in the side walls that prevents products from falling out of the roll container. Corresponding longitudinal and transverse struts must be positioned in such a manner that nesting can still be guaranteed, i.e., in a lateral intermediate space parallel to the reference plane and delimited by the rear end strut or the front end strut.

It is disadvantageous in this roll container that the products can only be placed one atop another on the base of the container, so that it is not easily possible to remove products in the middle of the stacked containers. The only known solution to this problem is to suspend intermediate bases from the grid of the side walls of such a container. For this purpose, however, the intermediate bases must be tilted or inclined relative to the horizontal plane and then brought into engagement with the grid by appropriate engagement means. Due to the necessary tilting, it is not possible to subsequently insert an intermediate base if no sufficient margin of vertical space is available, because the latter is limited by already loaded products or the next intermediate base.

The problem of the present invention is therefore to create a roll container that, with a simple construction, allows easy insertion of intermediate bases without the need for a large margin of space in the height direction of the container, so that a problem-free subsequent insertion of intermediate bases becomes possible. The invention is likewise based on the problem of creating an intermediate base that brings the above-mentioned advantages in connection with such a container.

SUMMARY OF THE INVENTION

In a stackable roll container embodiment, the invention uses the principle known from DE 10 2007 033 147 B4 for guaranteeing the stackability of the container, wherein each vertical front strut lies in one of two vertical reference planes and the rear end struts are offset sufficiently inward relative to the respective reference plane that another roll container of the same type can be inserted from the front between the side walls of the roll container. The horizontal connecting struts are arranged and constructed in such a manner that, apart from a front connecting section to the front end strut and a rear connecting section to the rear end strut, they lie in the intermediate space delimited by two limit planes parallel to the respective reference plane, the inner limiting plane being defined by the exterior sides of the rear end struts and the outer limit plane being defined by the interior sides of the front end struts.

The invention further proceeds from the recognition that, instead of suspending intermediate bases initially inserted on edge between the side walls into the grid-like struts of the side walls, it is possible to provide supporting struts that allow the insertion of an insert base from the front side of the container, the supporting struts functioning not only as support means in the inserted state of the insert bases, but also as guide means during the insertion. For this purpose, lateral contact means of a suitably designed insert base can initially be placed at their rear end areas onto the front areas of the supporting struts and then the insert base can be pushed to the rear.

This of course presumes that, in the area of the contact surface for the contact means of the insert base, which simultaneously serves as a guide surface for the insertion, the supporting struts do not have any hindrances to the insertion, in particular no vertical struts. Either such vertical struts are completely forgone or they are connected to the support struts outside of this contact area and must therefore run outside it. It is possible, for example, to connect vertical struts for creating a lateral grid to the respective exterior side of the support ribs, in which case it is no longer possible, however, to reach around the support ribs with bracket-like arms angled downwards. This would prevent, at least for the support struts with the typical rectangular or circular cross-section, the insert base from being inserted completely inside the side walls after its rear area has been inserted, since the vertical grid struts would block that.

It is possible, however, to use support struts with a more complex cross-section, for example those which have a projection on the outer lower side, so that it becomes possible for the angled arms of the insert base to reach around the area of the cross-section above the projection, even if the vertical grid struts are mounted on the outside of the outer projections in the lower area of the cross-section. It is also conceivable to use simple cross-sections, e.g., a rectangular or round cross-section, for the support struts and to provide outward-projecting carrier elements on their lower side for the vertical grid struts.

With these variants, it is possible, by using vertical struts that form a grid with the support struts, to use not only basket-like insert bases, but also insert bases that only have a flat support surface for products. The vertical grid bars prevent the products from falling out of the container laterally.

It is further possible to use additional horizontal struts that do not serve as support struts in order to make the grid finer. Like the vertical struts, these horizontal struts must lie in the intermediate space defined by the two reference planes parallel to the respective reference plane E-E, in order not to hamper the stackability of the container where stackability is desired.

According to one embodiment of the invention, the front connecting section of a support strut can be curved inwards relative to the reference plane and the rear connecting section outwards, and the section of the support strut between them can run parallel to the reference plane. The parallel part of the support struts guarantees that, even for insert bases with holding means that reach over the support struts with arms angled downwards (at least over a sufficient height), it is possible to push the insert base backwards or to pull it out, while guaranteeing a lateral fixation of the insert base.

According to one preferred embodiment of the invention, an indentation is provided on the inner side of the front end strut in an area above the height of each support strut, the bottom of each indentation preferably being chosen to be sufficiently deep that it lies in a plane parallel to the reference plane that is defined by the exterior side of the support strut, or offset to the outside from this plane. This guarantees that the contact means on the insert bases can extend as far outward as possible and simultaneously that an insertion of the insert base without previous tilted insertion is possible.

The indentations preferably have a height that is greater than or equal to the height of lateral contact means of an insert base that can be inserted from the front between the side walls of the container. Thus even retaining means of an insert base that are angled downwards, which (partially) reach around the support struts on the outside, at least after a partial or complete insertion, can be used without the need for a tilted insertion of the insert base.

These and other advantages and features of the invention will be apparent from the following description of the preferred embodiments, considered along with the accompanying drawings.

BRIEF DESCRIPTION OF THE DRAWINGS

The invention will be described below with reference to embodiments illustrated in the drawings. In the drawings.

DESCRIPTION OF ILLUSTRATIVE EMBODIMENTS

Figure 1:
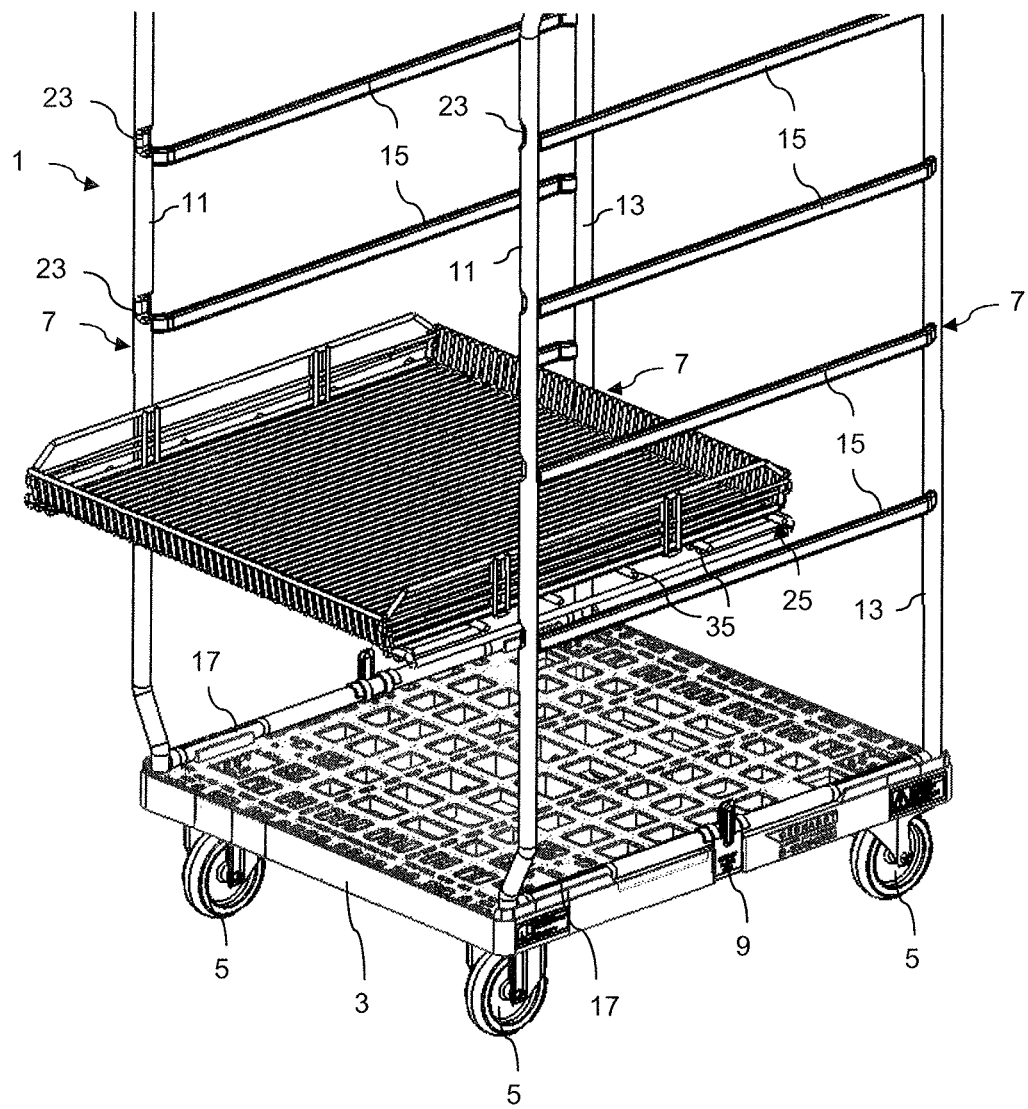
FIG. 1 shows a perspective view of a single stackable roll carrier according to one embodiment of the invention, with a partially inserted insert base.
Figure 4:
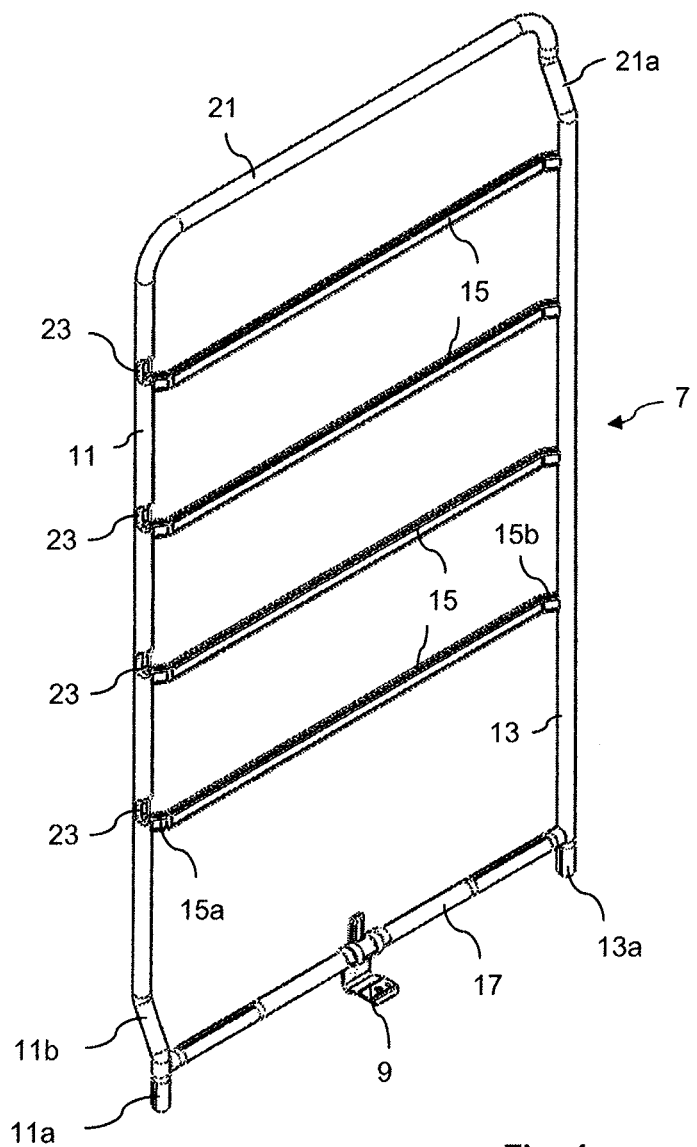
FIG. 4 shows a perspective view of the left side wall of the container in FIG. 1.

FIG. 1 shows an embodiment of a stackable roll container 1 according to the invention that has a rectangular base 3, on the underside 4 of which rollers 5 are arranged. Two of the rollers 5 are typically formed as steerable rollers. Two side walls 7 that are fixable to the base 3 by means of a fastening element 9, as shown in FIGS. 1 and 4, are arranged on the lateral sides of the base 3, each extending along the respective lateral side from a front side of the base 3 to a rear side of the base 3. Each side wall 7 as a vertical front end strut 11 and a vertical rear end strut 13, which are connected by means of several horizontally running support struts 15 in the illustrated embodiment.

At their respective end areas, the vertical front and rear end struts 11, 13 of each side wall 7 are connected by a base strut 17. The end struts 11, 13 each protrude downwards at their lower ends with insertion parts 11a and 13a past the base strut 17. The side walls 7 can be pushed with these insertion parts 11a, 13a into corresponding receptacle openings in the base 3. After insertion, they are detachably connected to the base with fastening elements 9, which can be constructed as fixation clamps for example. In this manner the side walls 7 can be quickly and easily mounted on and again dismounted from the roller base 3.

An insert base 19 can be inserted at the respective height on two cooperating (and horizontally aligned) support struts 15 of the side walls 7. The insert base can be constructed in the manner of a basket as shown in FIG. 1. This prevents the products placed on the insert base from falling laterally through the side walls 7. Of course the side walls 7 can also have additional vertical and horizontal grid bars (not shown) on their outer side so that products can be prevented from falling out even if the insert bases 19 are constructed as simple insertable intermediate bases. In addition, a rear wall can of course also be provided on the rear side of the roll container 1 and can likewise be configured as a plug-in wall and connected to the base 3 in the same manner as the side walls 7. Such a rear wall can of course also be detachably connected to the side walls 7.

Figure 2:
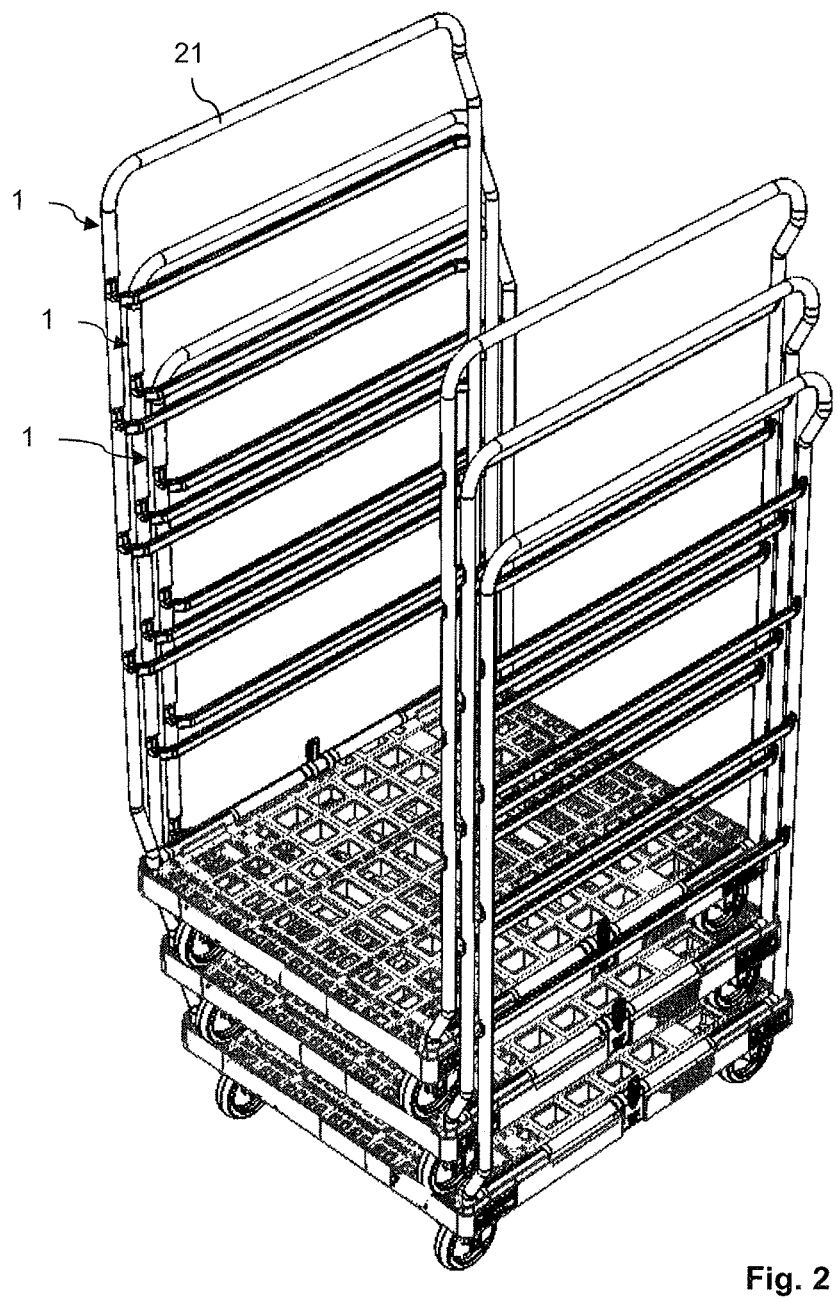
FIG. 2 shows a perspective view of several roll containers of FIG. 1 stacked together.

As is evident from FIG. 2, the side walls 7 are formed stackably by means of a special design of the side walls with respect to their geometry, with one roll container 1 being insertable into another roll container 1 from the front.

Figure 3:
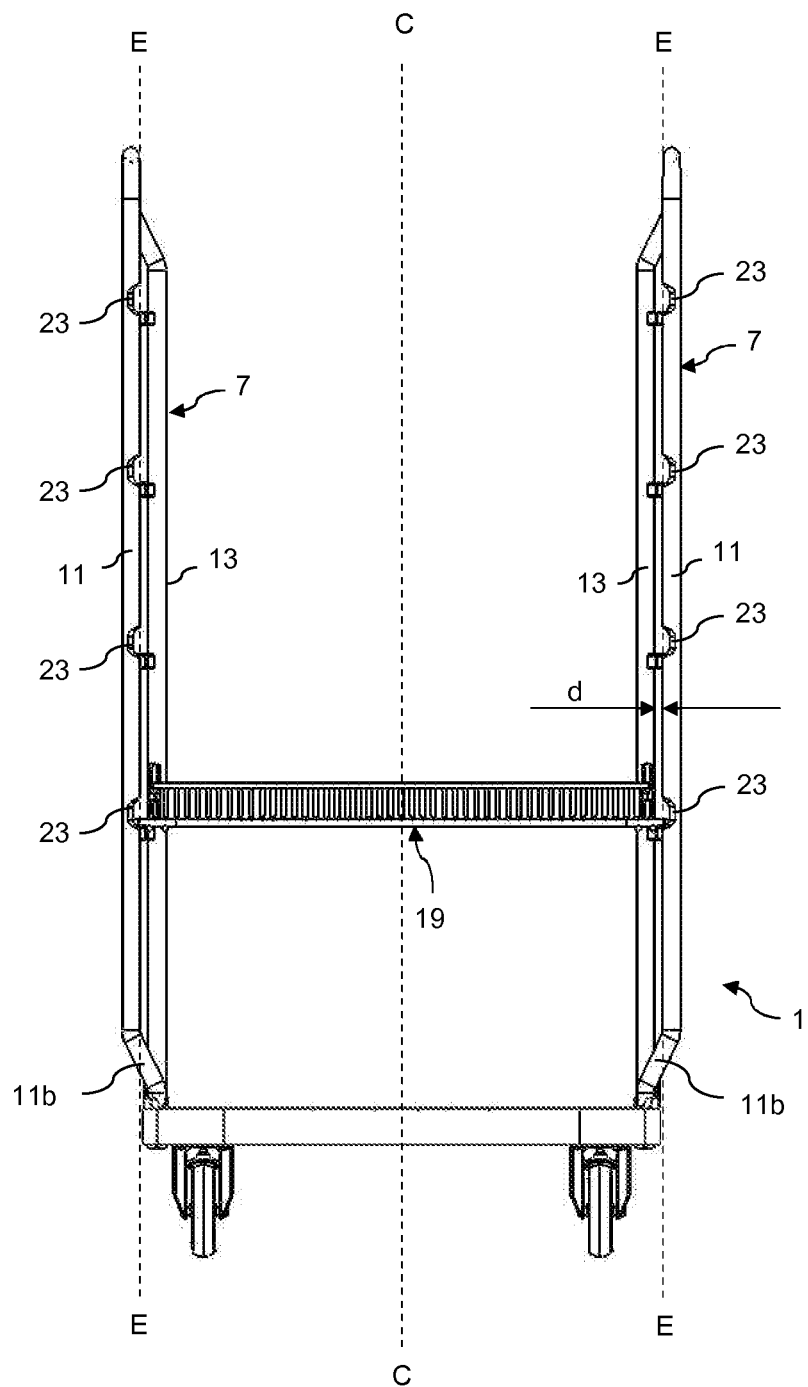
FIG. 3 shows a front view of the container in FIG. 1.

The special geometry of the side walls 7 is particularly evident from FIGS. 3-6. As shown in FIG. 3, the front end struts 11 of the side walls 7 define vertical planes E-E that run parallel to one another and likewise parallel to the exterior sides of the rectangular bases 3 of the roll container 1. Strictly speaking, the reference planes E-E are each defined by the interior sides of the front end struts 11. The rear end struts 13 are offset inwardly relative to the reference planes E-E sufficiently that, as is evident from the front view or projection of the side walls in FIG. 3, the entire rear end strut 13 likewise lies inside the immediate space between the two reference planes E-E. This makes it possible for such a roll container 1 to be inserted from the front into an identical roll container 1. The prerequisite for this is of course that the width of the base 3 of such a roll container 1 is smaller than the distance between the planes E-E. This is achieved by virtue of the fact that the front end struts 11 are connected to the respective base strut 17 via a connecting section 11b that is angled outward.

In order to achieve the stackability of the roll container 1, it is further necessary that the support struts 15 are also constructed such that, at least in the section that is to be inserted into another container in the depth direction of the side walls 7, they do not project outwards beyond the respective reference plane E-E (relative to the intermediate space between the planes E-E). At the same time, the respective interior side of this horizontal section of the support struts 15 cannot project further inward than the plane that is defined by the exterior side of the rear end struts 13 and lies parallel to the reference plane E-E. In other words, as shown in FIG. 4, the part of the support struts 15 that preferably runs parallel to the reference plane E-E and lies between a front connecting section 15a and a rear connecting section 15b must lie over its entire cross-section in the intermediate space between the respective reference plane E-E and the above-defined additional plane. In other words, the projection of the section of a support strut 15 between the connecting sections 15a, 15b must lie within the distance between the projections of the front and rear end struts 11, 13, which is marked "d" in FIG. 3.

It will also be noted from FIG. 3 that each horizontal support strut is located between an inside surface of the front vertical strut of the respective side wall and an imaginary vertical center plane C that runs along the center of the base from the front side of the base to the rear side of the base. The portion of each horizontal support strut between the front connecting section and rear connecting section extends parallel to the vertical center plane C.

The support struts 15 can be formed, for example, as tubes with a rectangular cross-section.

As already mentioned above, horizontal grid bars (not shown) can be arranged on the exterior side of the support struts 15. They must likewise lie inside the above-mentioned intermediate space in order to continue to guarantee the stackability of the container.

As is evident from FIG. 4, each side wall 7 can also have a horizontal connecting strut 21, the essential part of which, i.e., that part up to the connecting section 21a, lies in the plane of the front base strut 11. The connecting section 21a runs outwards starting from the rear end strut 13. This assures the stackability of the roll container 1.

Figure 5:
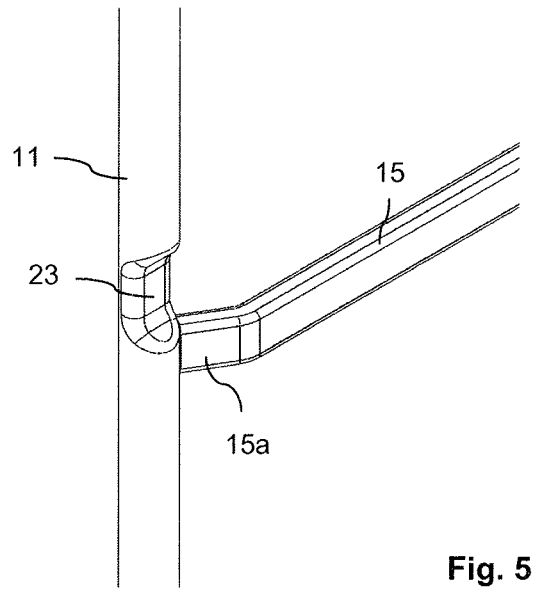
FIG. 5 shows an enlarged front portion of the left side wall shown in FIG. 4 from the same perspective as FIG. 4.
Figure 6:
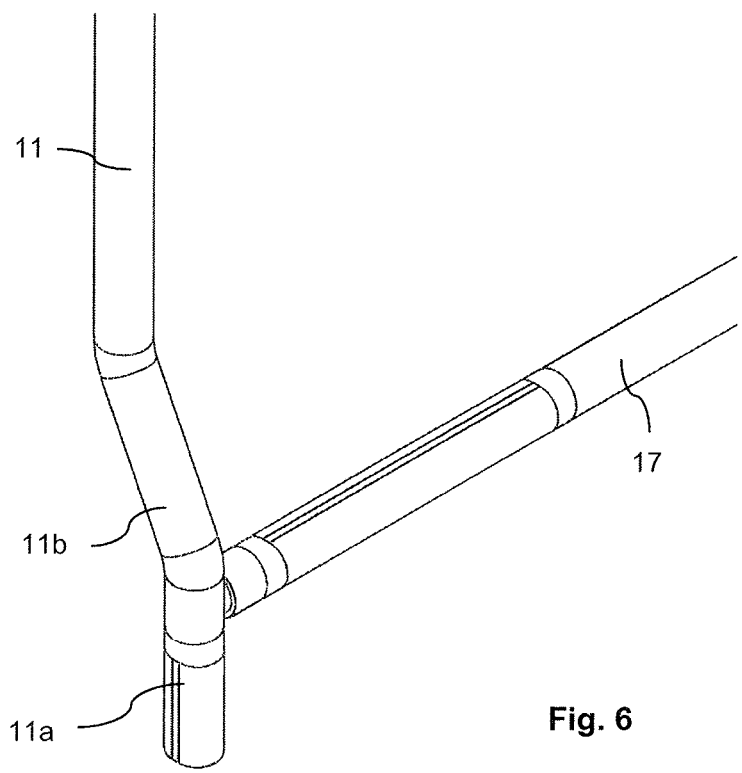
FIG. 6 shows another enlarged front portion of the left side wall shown in FIG. 4.

On their interior sides, as is seen from the figures, particularly FIGS. 3 and 5, the front end struts 11 of the side walls 7 have indentations 23 that are slightly higher than the adjacent support struts 15. The depth of the indentations 23 is selected in such a manner that an insert base 19 that has lateral contact elements 25 (shown in FIGS. 7 and 8) extending laterally outwards on both sides can be inserted from the front between the side walls 7. By providing the indentations 23, it is possible to construct the lateral contact elements 25 as bracket-like elements (see FIG. 7) that are angled downwards. The bracket-like elements have ribs 27 running in one direction along the side wall that cover the support struts 15 by means of the provision of downward-angled sections 29. In this way, a lateral fixation of the insert base 19 is achieved because the downward-angled sections 29 and perhaps ribs 27 may contact a lateral surface of the respective support strut 15 to resist lateral movement of the insert base 19 in the inserted position.

Figure 7:
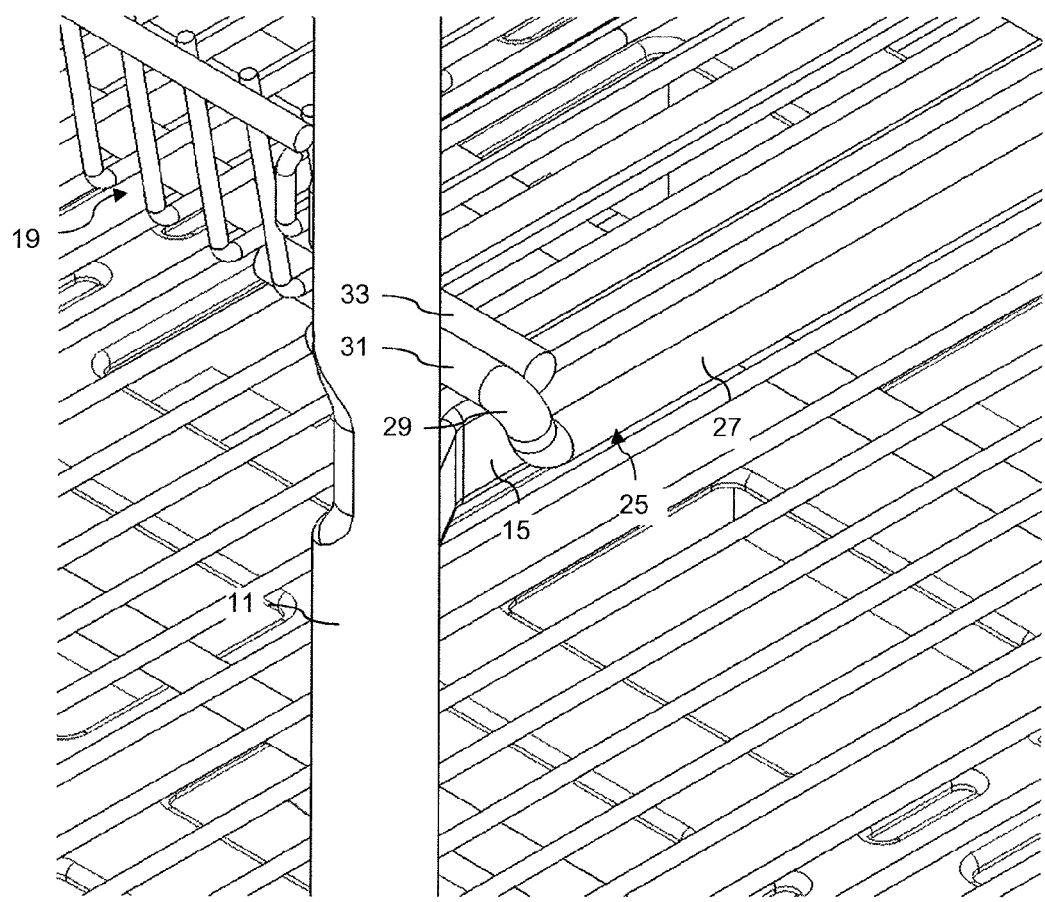
FIG. 7 shows an enlarged cutout of the right front area of an insert base inserted on support struts into the container of FIG. 1.

In the illustrated embodiment according to FIG. 7, the downward-angled section 29 is connected to a contact strut 31 that is connected to a cross strut 33 of the insert base 19. Such contact struts and cross struts 31, 33 are provided both on the respective front lateral area of the insert base 19 and on its rear lateral area. In the inserted state of the insert base 19, the cross strut 33 and the contact strut 31 both rest on the upper side of the respective support strut 15, this upper side representing a horizontal support surface for the insert base 19. It is possible, however, to provide the downward-angled section 29 directly on the cross strut 33.

The insert base 19 can also have additional cross struts 35 (FIG. 1) that likewise are led sufficiently far outward that they rest on the respective support strut 15.

As is evident from FIG. 7, the downward-angled section 29 is preferably arranged such that, in the inserted state of the insert base 19, it is situated (at each corner of the insert base 19) in the vicinity of the respective connecting section 15a or 15b. This yields a fixation of the insert base in the insertion direction when the insert base has been inserted.

Figure 8:
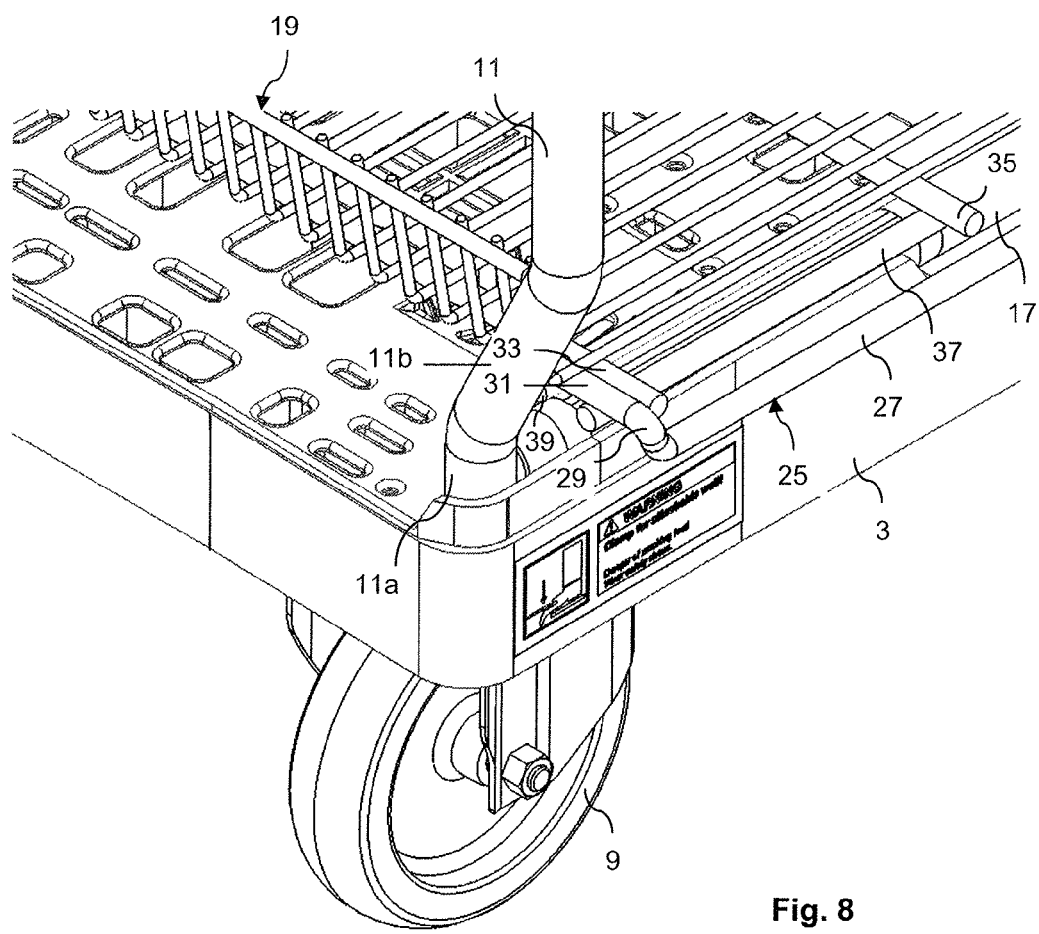
FIG. 8 shows an enlarged cutout of the right front area of an insert base inserted onto the base struts of the container according to FIG. 1.

As is evident from FIG. 8, it is likewise possible to insert an insert base 19 designed in this manner directly on top of the base 3 of the roll container 1. In this case, longitudinal struts 37, 39 provided underneath the cross struts 31, 33 and arranged perpendicular to the cross struts 31, 33 lie directly on top of the lower base strut 17. The position and spacing of the longitudinal struts 37, 39 are selected in such a manner that pressure is applied to the periphery of the connecting strut 17 to secure the insert base 19 against lateral movement.

The strut 17, which is connected to the downward-angled sections 29, reaches around the side wall of the base 3 a defined distance away from it, without a lateral fixation taking place thereby.

In the position shown in FIG. 8, the insert base 19 can no longer be pushed in from the front, however. Instead, it must be put in this position from above, for example by means of a tilted, i.e., slightly slanted introduction from the front between the side walls 7 and subsequently be set down onto the base 3. It goes without saying that the insertion can also take place from this side through the front and rear end struts of the side walls 7. This applies at least if not only the cross struts 31 have a distance between them that is less than the lateral distance between the end struts 11, 13, but also the entire insert base is smaller in width than this distance.

When an insert base 19 is inserted from the front (shown for example in FIG. 1), a rear stop for the insertion movement results from the contact of the cross strut 31 with the rear end strut 13 or by the stopping of the angled section 29 at the rear connecting section 15b of the support strut 15. With a basket-like construction of the insert base 19, its rear wall can be similarly constructed in such a manner that it strikes against the front side of the rear end strut 13.

If additional vertical struts for the side walls 7 are necessary, they can be connected to the side walls by virtue of the fact that the support struts 15 have one or more outward projections or connecting elements, as already explained above. The vertical struts could then be connected to the latter, which would likewise have to be arranged in the same intermediate space as that which was defined above in connection with a possible arrangement of the areas of the support struts 15 between the connecting sections 15a, 15b. This is necessary to guarantee the stackability.

In this matter a structurally simple stackable roll container results, which likewise has the possibility for intermediate bases to be inserted not only into a lateral grid of the side walls, but from the front.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Terms such as "vertical" and "horizontal" refer to the orientation of the roll container shown in the drawings.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A roll container including:
   (a) a base having a front side and a rear side, with an imaginary vertical center plane running along the center of the base from the front side to the rear side;
   (b) a number of transport rollers mounted on an underside of the base;
   (c) a first side wall attached to the base at a first lateral side of the base and extending upwardly from an upper surface of the base, and a second side wall attached to the base at a second lateral side of the base and extending upwardly from the upper surface of the base, the first and second side walls each having a respective front vertical end strut and a respective rear vertical end strut with one or more horizontal support struts connecting the respective front vertical end strut and rear vertical end strut;
   (d) wherein at least one horizontal support strut of the first side wall is aligned in a horizontal plane with a respective horizontal support strut of the second side wall to produce a respective insert base support in which the respective horizontal support strut of the first side wall provides a first horizontal support surface located between an inside surface of the front vertical end strut of the first side wall and the vertical center plane, and in which the respective horizontal support strut of the second side wall provides a second horizontal support surface located between an inside surface of the front vertical end strut of the second side wall and the vertical center plane;
   (e) a respective indentation in each front vertical end strut for each horizontal support strut connected thereto, each respective indentation being located on an inner side of the respective front vertical end strut in an area immediately above the respective horizontal support strut and opposing a respective indentation located on an inner side of the other front vertical end strut; and
   (e) an insert base adapted to be received and supported on a respective insert base support in an inserted position in which both a front portion of the insert base and a rear portion of the insert base are supported on a respective upper surface of the respective insert base support, the insert base (i) having a width less than the distance between the front vertical end strut of the first side wall and the front vertical end strut of the second side wall at the level of the respective opposing indentations therein, and (ii) having a first lateral side located proximal to the first side wall when the insert base is in the inserted position and a second lateral side located proximal to the second side wall when the insert base is in the inserted position, and (iii) having one or more lateral support elements at each lateral side of the insert base, and (iv) wherein each lateral support element includes an elongated rib member that extends along a lateral surface of the horizontal support strut at that lateral side of the insert base when the insert base is in the inserted position.

2. The roll container of claim 1 wherein the rear vertical end strut of each side wall is offset inwardly toward the vertical center plane with respect to the front vertical end strut of the respective side wall, and wherein each horizontal support strut of a respective side wall is located in an intermediate space between an outside surface of the rear vertical end strut of that respective side wall and the inside surface of the front vertical end strut of that respective side wall.

3. The roll container of claim 2 wherein each horizontal support strut includes a front connecting section that is curved inwards relative to the inside surface of the respective front vertical end strut, and a rear connecting section that is curved outwards relative to the respective rear vertical end strut, and wherein the portion of each horizontal support strut between the front connecting section and rear connecting section extends parallel to the vertical center plane.

4. The roll container of claim 1 wherein the deepest part of each indentation lies in a plane defined by an outer side of the respective horizontal support strut facing away from the vertical center plane, or lies outside of that position relative to the vertical center plane.

5. The roll container of claim 4 wherein each indentation has a height that is greater than or equal to the height of the lateral support elements of the insert base.

6. The roll container of claim 1 wherein the base includes a number of receptacles and the respective front vertical end strut and rear vertical end strut of each side wall includes an insertion part adapted to be inserted into a corresponding one of the receptacles.

7. The roll container of claim 6 wherein the base includes a respective channel at each lateral side of the base and wherein each side wall includes a base strut connected between the front vertical end strut and rear vertical end strut of the respective side wall, each respective base strut adapted to be received in a respective one of the channels.

8. The roll container of claim 7 wherein each base strut includes a fastening element mounted thereon which is adapted to be moved to a secured position in which it cooperates with the base to secure the respective side wall to the base.

9. The roll container of claim 1 wherein a portion of each lateral support element rests on the respective horizontal support strut when the insert base is in the inserted position.

10. The roll container of claim 1 wherein each lateral support element includes a downward-angled, bracket arm which reaches around an outside surface of the respective horizontal support strut when the insert base is in the inserted position.

11. The roll container of claim 1 wherein the insert base includes two or more cross struts that extend transverse to the vertical center plane and rest on the horizontal support struts when the insert base is in the inserted position.

12. The roll container of claim 1 wherein the elongated rib member of the respective lateral support element extends along the entire length of that respective lateral side of the insert base.

13. The roll container of claim 10 wherein the elongated rib member of the respective lateral support element is connected at a distal end of the bracket arm and extends along the outside surface of the respective horizontal support strut when the insert base is in the inserted position.

14. The roll container of claim 1 wherein each horizontal support strut includes a front end which connects to and terminates at a rear side of the respective front vertical end strut.

15. The roll container of claim 1 wherein each lateral support element is in position to provide contact with a lateral surface of the horizontal support strut at that lateral side of the insert base when the insert base is in the inserted position.

* * * * *

UNITED STATES PATENT AND TRADEMARK OFFICE
CERTIFICATE OF CORRECTION

PATENT NO. : 8,505,933 B2
APPLICATION NO. : 12/955655
DATED : August 13, 2013
INVENTOR(S) : Oliver Bernard et al.

It is certified that error appears in the above-identified patent and that said Letters Patent is hereby corrected as shown below:

In the claims

1. In claim 1, at column 7, line 51, "(e)" should read --(f)--.

Signed and Sealed this
Fifteenth Day of October, 2013

Teresa Stanek Rea
*Deputy Director of the United States Patent and Trademark Office*